Feb. 10, 1925.
J. H. HART
PLANTER
Filed Feb. 21, 1924
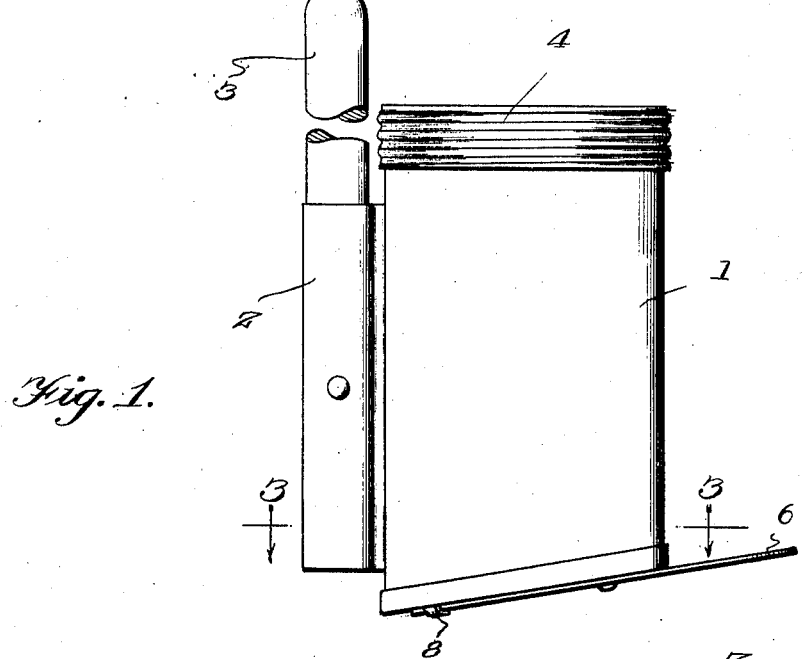
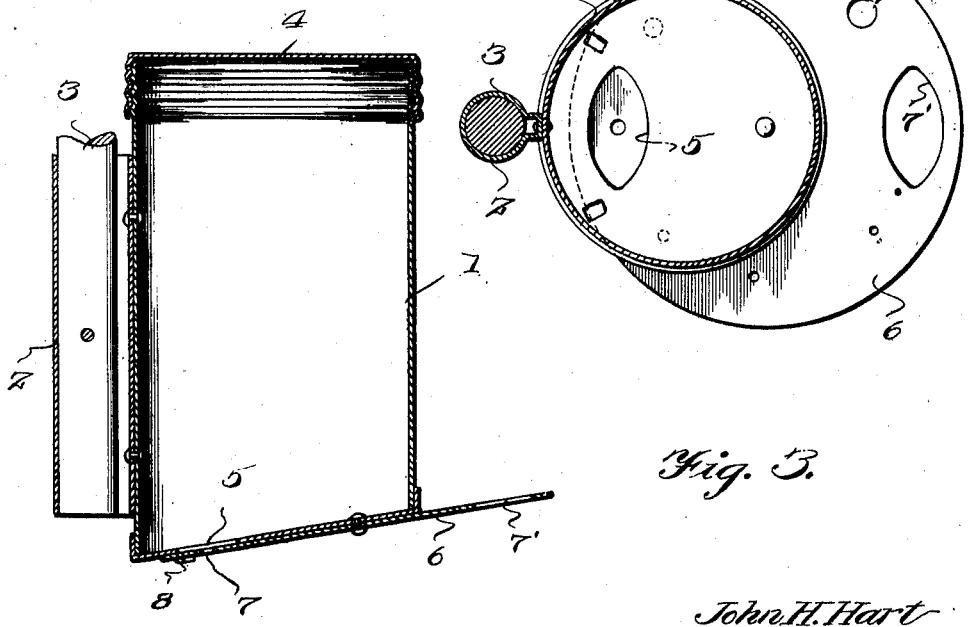
John H. Hart INVENTOR Patented Feb. 10, 1925.

1,526,210

UNITED STATES PATENT OFFICE.

JOHN H. HART, OF HALL, WASHINGTON.

PLANTER.

Application filed February 21, 1924. Serial No. 694,365.

*To all whom it may concern:*

Be it known that I, JOHN H. HART, a citizen of the United States, residing at Hall, in the county of Clarke and State of Washington, have invented new and useful Improvements in Planters, of which the following is a specification.

This invention relates to a clamp, the general object of the invention being to provide a device of this kind whereby a small amount of seed can be easily and quickly scattered in rows or drills.

Another object of the invention is to provide adjustable feeding means for regulating the amount of seed dropping from the device.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view of the complete device.

Figure 2 is a longitudinal sectional view.

Figure 3 is a sectional view taken on line 3—3 of Figure 1.

In these views, 1 indicates a container which is provided with a socket 2 to receive a handle 3. The container is provided with a cap 4 and its bottom has an opening 5 therein and said bottom slopes towards the opening so that all the contents of the container will pass through the opening. A disc 6 is pivoted to the body and said disc is provided with a plurality of holes 7 which are of various sizes and shapes so as to control the passage of seed through the opening. A portion of the disc is left solid so as to entirely close the opening to prevent the seed dropping therethrough. One of the holes, shown at 7', is made of the same size as the opening in the bottom so that the device can be used with comparatively large sized seed.

From the foregoing it will be seen that when the disc is turned to bring the proper sized hole opposite the opening 5 and the container held by the handle over the furrow, seed will drop from the container into the furrow so that it is only necessary for the operator to walk along with the container over the furrow. By using a long handle the operator does not have to bend over as in planting by hand.

The bottom of the container is provided with guiding fingers 8 for the disc.

The disc 6 is of larger diameter than the container so that it can be easily grasped by the hand to rotate it and by making it larger it can be provided with a large number of holes. The cap is preferably threaded to the container so that it will be securely held thereon as the device must be shaken by the operator to cause the seeds to pass therefrom.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A planting device of the character comprising a container having an apertured bottom wall outwardly and upwardly inclined, a relatively large disk pivoted to the lower wall of the container and having a plurality of varying sizes of openings therein, and adapted to selectively register with the aperture provided in the bottom of the container, a pair of finger members provided on the bottom of the container adjacent the opening therein and adapted to engage over the periphery of the disk, a hollow cylindrical member secured to the sides of the container adjacent the lowermost portion thereof adjacent the opening therein, and a handle member positioned in the hollow cylindrical member for the purpose set forth.

In testimony whereof I affix my signature.

JOHN H. HART.